Jan. 29, 1957  J. P. KNAUTH ET AL  2,779,384
WIRE FEEDING AND STRAIGHTENING APPARATUS
Filed Dec. 4, 1953  2 Sheets-Sheet 1

INVENTORS.
JOHN P. KNAUTH
KENNETH R. LANG
BY
Richard von K. Bruns
Attorney

Jan. 29, 1957 J. P. KNAUTH ET AL 2,779,384
WIRE FEEDING AND STRAIGHTENING APPARATUS
Filed Dec. 4, 1953 2 Sheets-Sheet 2

INVENTORS.
JOHN P. KNAUTH
KENNETH R. LANG
BY
Richard von K. Bruns
Attorney

United States Patent Office 2,779,384
Patented Jan. 29, 1957

2,779,384

WIRE FEEDING AND STRAIGHTENING APPARATUS

John Peter Knauth, Skaneateles, and Kenneth R. Lang, Liverpool, N. Y., assignors to Syracuse Special Machine Company, Inc., Syracuse, N. Y., a corporation of New York Application December 4, 1953, Serial No. 396,289

7 Claims. (Cl. 153—100)

This invention relates to wire feeding devices, and has particular reference to a novel apparatus capable of simultaneously feeding and straightening wire, the apparatus being especially adapted for use with welding wire for automatic welding machines.

As is well-known to those familiar with the welding art, the welding electrode or welding wire employed in connection with automatic welding machines is usually fed to the weld joint by a wire feeding device consisting of a pair of confronting rollers mounted on parallel axes. At least one of these rollers is power driven and, as the wire is received between them, the rollers impart tangential velocity thereto. Conventionally, the roller surfaces are milled or knurled to prevent slippage between the rollers and wire, and this causes the wire to become similarly milled or knurled. In small diametered wire, the wire surface frequently becomes quite ragged and at times the wire is strained to the breaking point which, of course, is highly undesirable. In addition, milled rollers sometimes impart a jerky motion to the wire being fed thereby.

The wire feeding device normally draws the wire from a reel or other source of supply and, since the wire usually contains loops or kinks as it comes off the reel, it is necessary to use some type of wire straightener in connection with the feeding device, the straightener being interposed between the device and the reel. The necessity for a wire straightener in addition to the feeding device increases the distance between the supply reel and weld joint, and generally increases the over-all bulk and cumbersomeness of the welding equipment. This situation, together with the aforementioned undesirable features of conventional feeding devices, has caused dissatisfaction with the wire delivery portions of most of the welding equipment in use today and while various attempts have been made to improve this portion of the equipment, none of these attempts have heretofore resulted in an entirely satisfactory arrangement.

With the foregoing considerations in view, it is the primary object of the present invention to provide a greatly improved wire feeding and straightening arrangement comprising a single apparatus which is capable of simultaneously feeding and straightening the wire.

Another important object of the present invention is to provide a single apparatus for simultaneously feeding and straightening wire which is relatively small and compact in form.

Still another important object of the invention is to provide a wire feeding and straightening apparatus for welding wire which responds very quickly and accurately to variations in the welding current to feed the wire to the weld joint at the proper rate of speed at all times.

A further important object of the invention is to provide a wire feeding and straightening apparatus which in no way disfigures or injures the wire.

A still further object of the invention is to provide a wire feeding and straightening apparatus which is practical and economical to manufacture and operate.

A more specific object of the invention is to provide a wire feeding and straightening apparatus wherein the wire is moved by operation of a worm-gear principle.

Another specific object of the invention is to provide a wire feeding and straightening apparatus for welding wire wherein the latter is energized through adequate surface contact.

Other objects and advantages of the invention will become apparent from the following detailed description read in conjunction with the accompanying drawings wherein like reference numbers designate corresponding parts in all the views.

Figure 2:
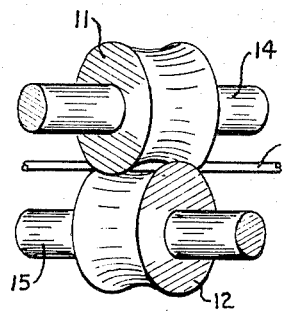
Figure 2 is a detail view showing the coaction of the two concave feed rollers.
Figure 3:
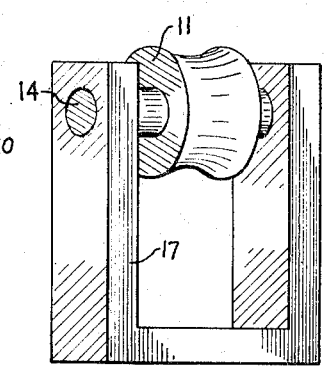
Figure 3 is a perspective view of one of the rollers mounted in its support bracket.
Figure 4:
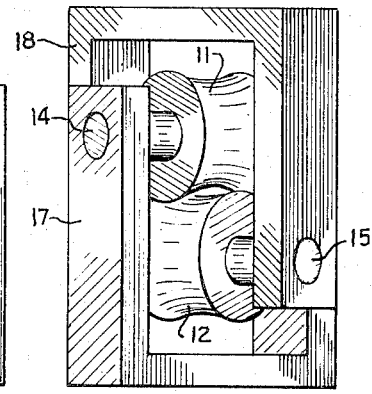
Figure 4 is a perspective view of the roller and support bracket assembly.

Having reference now to the drawings, which illustrate a typical embodiment of the invention for the purpose of the disclosure, the wire 10, Figure 2, is moved and straightened in a manner to be hereinafter more fully explained by means of a pair of rollers 11, 12 having hardened concave roller surfaces. The rollers are arranged in skewed relation, or with their axes oblique to one another, and the wire is received between the confronting roller surfaces thereof as shown. The rollers 11, 12 are fixed on, or formed integrally with, roller shafts 14, 15, respectively. Roller shaft 14 is journalled in the sides of a U-shaped support bracket 17 so that the roller 11 extends substantially across the open side thereof, and roller shaft 15 is similarly mounted in a second, identical bracket 18. The bracket and roller assemblies are linked together, as best shown in Figure 4, with the brackets 17, 18 extending in diametrically opposite directions.

The linked bracket and roller assemblies are mounted in a disc shaped member 20, the central portion of which is removed as indicated at 21. The brackets 17, 18 are slidably received in channels 22, 24, in the disc member, the cut away portion 21 thereof providing free clearance for the rollers 11, 12. In the illustrated embodiment, the acute angle between the channels 22, 24 is 72°, this angle having been found to provide the proper skewed relation between the rollers 11, 12. It will be understood, however, that as the degree of concavity of the rollers varies, the angle between the roller axes may also vary, the example given being but one operable arrangement.

In static condition, the disc and brackets are maintained in properly assembled relation by means of compression springs 25 which are confined between the disc and plates 27, one such plate being secured as by screws 28 to the bottom of each bracket. These springs serve to urge the rollers 11, 12 towards one another and into close engagement with the wire extending therebetween, and also function as a take-up means whereby the apparatus can within reasonable limits feed wire of various sizes. There are two springs for each bracket, extending between the disc 20 and each end of plate 27, and the ends of these springs are positioned in opposing counterbores 30 in the disc and plates. Counterbores 30 are associated with tapped holes 31 into which headless set screws 32 are threaded for a purpose to be hereinafter explained.

The disc member 20 rotates at relatively high speed during operation of the apparatus and to this end is formed with a shaft 34 extending outwardly from the edge thereof. Shaft 34 is journalled in insulated bearings 35 mounted in a support member 37 which is secured to a platform 38 on the motor 40. Either the member 37 or the motor 40 may be attached to the welding machine by any suitable mounting means. Outwardly of the bearings 35, the shaft 34 is fitted with a thrust collar 41 which is fixed on the shaft with set screw 42. Inwardly of the bearings, the shaft carries a reduction gear 44 which meshes with a gear 45 fixed on the motor shaft 47.

Figure 1:
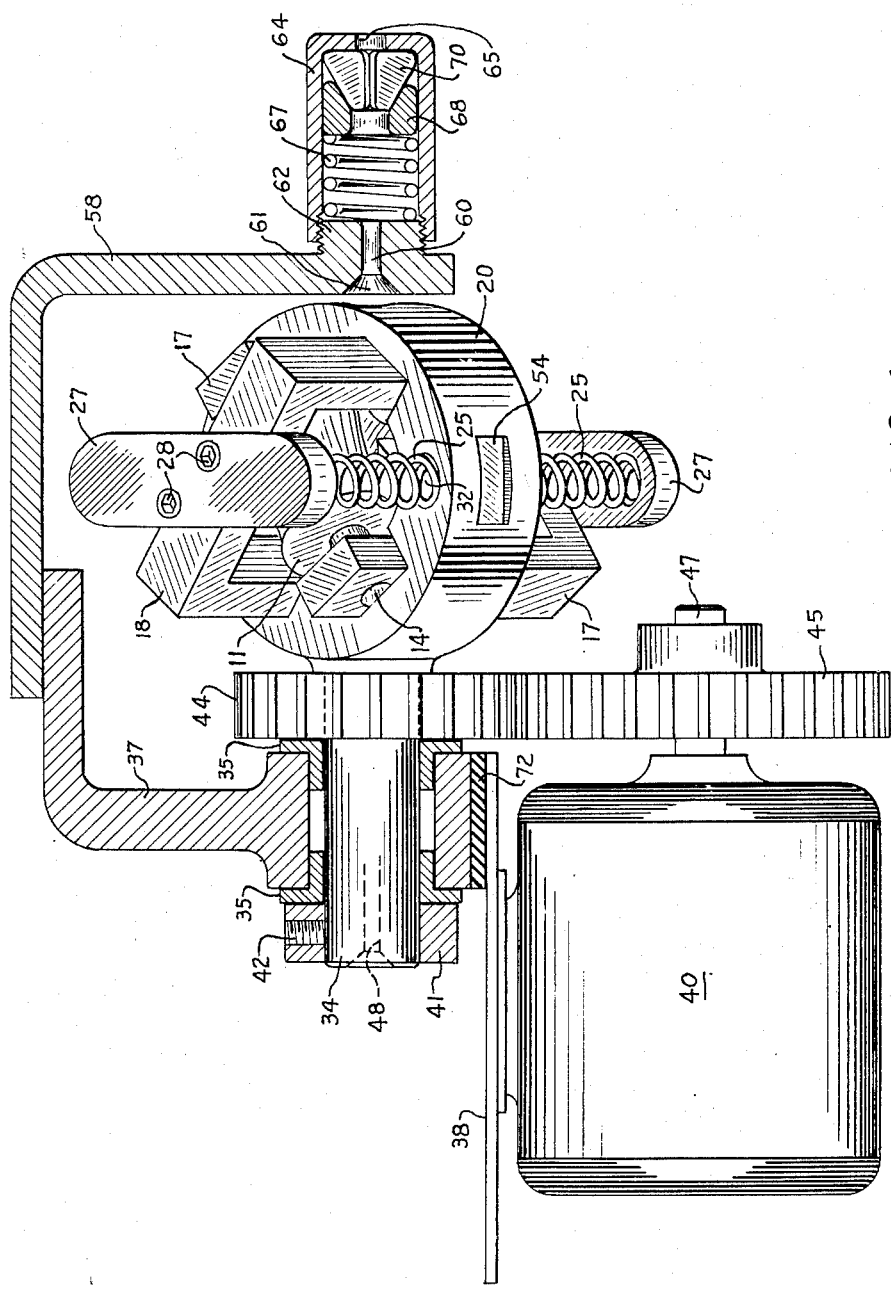
Figure 1 is a side elevation, partially in section, of the wire feeding and straightening apparatus of the invention.
Figure 5:
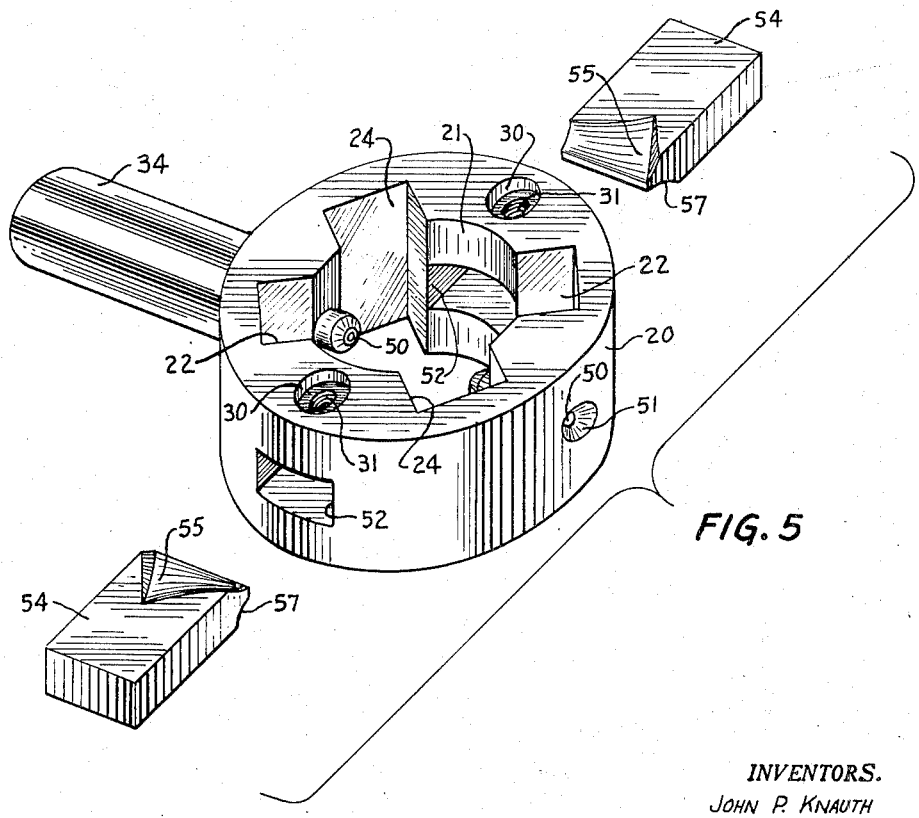
Figure 5 is an exploded view of the primary rotatable member and wire guide bars.

The shaft 34 is provided with a central axial bore 48 which communicates with a diametral bore 50 through the disc member 20. The bore 50 terminates in a counterbore 51 in the edge of the disc member as best shown in Figure 5. Welding wire from a suitably supported reel or other supply source, not shown, is threaded through the shaft bore 48, the communicating portion of disc bore 50, and between the rollers 11, 12 as indicated in Figure 1. Disc member 20 is formed with transverse slots 52 extending at substantially right angles to the bore 50, and guide bars 54 are positioned in these slots. The guide bars 54 are cut away at 55, 57 to form nose portions which project between the skewed rollers on either side of the wire to prevent the latter from moving out of a straight axial path. When properly positioned in the disc, the bars 54 are secured thereto by tightening down on the set screws 32, previously described.

Fixedly secured to the support member 37 is a secondary support member 58 which is an angle arm terminating just below the disc 20. Arm 58 is provided with a transverse bore 60 which is in alignment with the bore 50 through the disc 20 and receives the wire emerging therefrom. Bore 60 is formed with a counterbore 61 to insure that the wire will pass smoothly into the bore. The bore passes centrally through a boss 62 on the outer side of the arm 58, and this boss is threaded to receive a cap 64 having an aperture 65 in the end thereof in alignment with the bore. A compression spring 67 is positioned within the cap 64, and this spring bears against the face of the boss 62 and an annular spring pad or collar 68. The collar 68 in turn engages a collet 70 comprising four jaws which are the four quarters of a frustocone as indicated. After passing through bore 60, the wire passes through the collar 68, collet 70 and aperture 65 from whence it is directed to the weld joint or other point of application. The grip exerted by the jaws of the collet upon the wire may be adjusted by tightening or loosening the cap 64 on the boss 62 which causes spring 67 to exert greater or less force on the collar 68. By obtaining proper adjustment, the jaws will prevent the wire from rotating as the disc 20 rotates and yet will permit the wire to be fed axially therethrough. This is the primary purpose of the collet assembly, although another important purpose, in the case of welding wire, is to electrically energize the wire through the jaws since the latter make excellent surface contact with a substantial length of wire by positive engagement therewith, without in any way damaging it or inhibiting its feed. To this end, current may be applied at any point along the support members 37, 58 since the latter are insulated from the remainder of the apparatus by the bearings 35 and an insulating pad 72 positioned between the member 37 and platform 38.

The operation of the above-described apparatus, as used for feeding and straightening welding wire, will now be described. Motor 40 is a variable high-speed D.-C. motor having a small diametered rotor and long field so that inertia forces within the motor are at a minimum and it can change speed rapidly in response to control signals received. The rate of wire feed will depend directly upon the speed of this motor which may in turn be governed by conventional welding controls such as those responsive to variations in the amount of resistance between the welding electrode and weld joint. At the start of the operation, the wire is drawn by hand from the supply reel or other source and pushed through the bore 48 in the shaft 34 until it is engaged by the rollers 11, 12, the latter being momentarily pushed apart to receive the wire by squeezing the plates 27 or their corresponding brackets 18 together against the action of springs 25. Thereafter, the motor is started and this causes the disc member 20 to be rotated through the action of gears 44, 45. The high speed motor 40 turns the disc member at an average speed of 3,000–4,000 R. P. M. in feeding the wire at the conventional rate of approximately 200 inches per minute, and this disc speed is a great deal higher than the 0–30 R. P. M. average speed of conventional knurled rollers on parallel axes. As the disc 20 rotates, brackets 17, 18 tend to move outwardly due to centrifugal action and this urges the rollers 11, 12 into closer engagement with the wire, see Figure 4. At the same time the rollers rotate as a unit about the wire, and while there is also some rotation of the rollers about their own roller shafts the velocity of such rotation is small in comparison to the velocity of rotation of both rollers about the wire as caused by the rotation of the disc 20. In this manner, the rollers act as a fixed worm wheel or gear which imparts longitudinal or axial travel to the wire or worm and moves it on through the disc and collet assembly to the point of welding. During this movement, the collet 70 prevents the wire from rotating with the rollers, as described hereinbefore. The great advantage of this method of feeding the wire is that the high speed of the D.-C. motor and consequent high speed of rotation of the disc 20 gives the apparatus a wide speed range thus making it very much more sensitive to variations in welding current than conventional feeding device. This sensitivity or accuracy of response is accompanied by an increase in the speed of response due to the fact that inertia forces are kept to a minimum and there is little or no backlash between coacting parts of the apparatus.

In direct contrast to conventional wire feeding devices which impart purely tangential velocity to the wire, the apparatus disclosed herein employs a screw principle which actually causes the rollers to crawl over, rather than grind against high spots or depressions on the surface of the wire, and in so doing the rollers act as the straightening as well as the feeding medium. While true rolling motion during normal operation is confined to one, or at the most, two axial loci of the rollers when zero resistance is offered the wire, introduction of external resistance to the movement of the wire from the supply side of the apparatus (the unstraightened end) produces wire tension which forces the wire into true common tangency with the rollers, thus producing the maximum screw effect to overcome such resistance and urge the wire past the rollers in spite of the irregularities which cause the resistance. Thus, the worse the condition of the wire, the greater the screw effect of the rollers, and the limiting factor becomes the maximum torque available in the motor.

From the foregoing description it will be apparent that the present invention provides a greatly improved apparatus which not only feeds wire without in any way damaging the surface thereof but also straightens the wire during the course of the feeding operation. In addition, due to the high speed of operation, the apparatus is quicker and more sensitive in responding to variations in welding current. The apparatus is relatively small and compact in form, and is both efficient and economical to manufacture and operate. The invention may be embodied in other specific forms without departing from the spirit or essential characteristics thereof. The embodiment disclosed is therefore to be considered in all respects as illustrative rather than restrictive, the scope of the invention being indicated by the appended claims.

What we claim is:

1. In an apparatus for feeding and straightening wire, a pair of support brackets, a roller having a smooth concave roller surface journalled in each bracket, said bracket and roller assemblies being linked together with said brackets extending in opposite directions and said rollers abutting one another in skewed relation, said rollers being adapted to receive the wire therebetween; a rotatable member, said brackets being slidably mounted in said rotatable member whereby rotation of the latter causes said brackets to tend to move apart bringing said rollers into close engagement with the wire, rotation of said rotatable member also causing said rollers to travel about the surface of the wire to move it in the axial direction.

2. In an apparatus for feeding and straightening wire, a rotatable member, a pair of oppositely extending support brackets slidably mounted on said member, a roller having a smooth concave roller surface journalled in each bracket, said bracket and roller assemblies being linked together with said rollers in contiguous skewed relation to receive the wire between the roller surfaces thereof, said brackets being forced apart by centrifugal action upon rotation of said rotatable member to urge said roller surfaces into close engagement with the wire, and said rollers being rotated about the axis of the wire upon rotation of said rotatable member to straighten said wire and advance it in the axial direction, and means to prevent the wire from rotating as said rollers are rotated thereabout.

3. Apparatus as defined in claim 2 together with spring means to hold said rollers in engagement with the wire when said rotatable member is in static condition.

4. Apparatus as defined in claim 2 together with a single, variable high-speed D. C. motor to rotate said rotatable member.

5. Apparatus as defined in claim 2 including means in said rotatable member to guide the wire to and from said rollers.

6. Apparatus as defined in claim 2 wherein said means to prevent the wire from rotating are positively contacting collet shoes.

7. Apparatus for feeding and straightening wire comprising fixed support means, a rotatable member journalled in said support means, a pair of U-shaped brackets slidably mounted in said rotatable member, a roller having a smooth concave roller surface journalled in each bracket adjacent the open side thereof, said bracket and roller assemblies being inter-related in link fashion and arranged in said rotatable member with said brackets extending outwardly therefrom in opposite directions and said rollers confronting one another in skewed relation, means in said rotatable member to guide a wire between the roller surfaces of said rollers, said brackets being forced apart by centrifugal action upon rotation of said rotatable member thereby urging said roller surfaces into close engagement with the wire extending therebetween, spring means coacting with said rotatable member and brackets to hold the latter apart when the former is in static condition, said rollers being rotated as a unit about the wire upon rotation of said rotatable member to sraighten said wire and advance it in the axial direction, and means associated with said fixed support means to prevent the wire from rotating as the rollers are rotated thereabout.

References Cited in the file of this patent

UNITED STATES PATENTS

| | | |
|---|---|---|
| 160,024 | Matheson | Feb. 23, 1875 |
| 216,967 | Nuttal | July 1, 1879 |
| 425,377 | Hartness | Apr. 8, 1890 |
| 467,098 | Hartness | Jan. 12, 1892 |
| 613,754 | Brightman | Nov. 8, 1898 |
| 760,406 | Gregersen | May 17, 1904 |
| 1,733,812 | MacRae | Oct. 29, 1929 |
| 1,733,835 | Steenstrup | Oct. 29, 1929 |

FOREIGN PATENTS

| | | |
|---|---|---|
| 539,200 | Great Britain | Sept. 1, 1941 |